United States Patent Office 3,728,337
Patented Apr. 17, 1973

3,728,337
PREPARATION OF 9α-FLUORO-11-OXO-STEROIDS
Derek Harold Richard Barton, London, England, assignor to Research Institute for Medicine and Chemistry Inc.
No Drawing. Filed June 9, 1971, Ser. No. 150,842
Claims priority, application Great Britain, June 17, 1970, 29,437/70
Int. Cl. C07c 173/00
U.S. Cl. 260—239.55 D  11 Claims

ABSTRACT OF THE DISCLOSURE

9α-fluoro-11-oxo steroids can conveniently be prepared by enolisation of an 11-oxo steroid with a substituted alkali metal amide and subsequent fluorination of the enolate by reaction with perchloryl fluoride. The invention is particularly applicable to 3-oxygenated - 11 - oxo steroids, although it is necessary to protect any 3-oxo groups.

This invention relates to the production of 9,11-enolates of 11-oxo steroids and to the production of 9α-fluoro-11-oxo steroids therefrom.

In our Belgian Pat. No. 720,642 we have described the reaction of 9,11-enol esters of 11-oxo steroids with trifluoromethyl hypofluorite and similar reagents, whereby a fluorine atom is introduced at the 9α-position and mild hydrolytic work up yields a 9α-fluoro-11-keto steroid. This process is of especial value in converting 11-oxo corticosteroids such as prednisone into their 9α-fluoro analogues which are well known to possess enhanced activity. We have now found that for this fluorination, an alternative and particularly effective reagent is perchloryl fluoride ($FClO_3$). This reagent has been found in many instances previously to act indiscriminately to produce unwanted by-products in high yield but with this particular class of substrates it has proved superior to other reagents which have been tested. In comparison with trifluoromethyl hypofluorite, perchloryl fluoride has the advantage of reacting directly with a 9,11-enolate without requiring intermediate conversion into an enol ester.

The particular class of 11-oxo steroids here concerned are those having a 4,5- or 5,6-double bond or a hydrogen atom at the 5α- or 5β-position and no free oxo group at the 3-position. In our Belgian Pat. No. 759,289 we have described the formation of enolates of steroid -1,4-diene-3,11-diones and have shown therein that when the dione is reacted with a strong base such as an alkali metal amide, 9,11-enolates are only formed by reaction of the initial enolate in which enolisation takes place at the 3-position only with unreacted dione whereby the alkali metal atom is transferred to the 11-position oxygen. This suggests that 11-oxo steroids having no 3-oxo group would be difficult to enolise and indeed triphenylmethyl sodium, a commonly used base for enolisation reactions, appears to fail completely to produce the desired 9,11-enolate. We have found that it is very much to be preferred to use as the base a substituted alkali metal amide such as an alkylamide or alkylsilylamide. Using such bases, the reaction is smooth, leads to few by-products and avoids formation of explosive mixtures with the perchloryl fluoride reagent.

Thus in the present invention we provide a process for the preparation of 9α-fluoro-11-oxo steroids which comprises enolising an 11-oxo steroid having a 4,5- or a 5,6-double bond or a hydrogen atom at the 5α- or 5β-position and no free oxo group at the 3-position by reaction with an alkali metal amide of the formula $$MNR^1R^2$$

wherein M is an alkali metal atom and $R^1$ and $R^2$, which may be the same or different, are alkyl, aryl, aralkyl, trialkylsilyl, triaralkylsilyl or triarylsilyl groups, and subsequently reacting the resulting enolate with perchloryl fluoride whereby a 9α-fluorine atom is introduced into the steroid nucleus.

The alkali metal amide may, for example, be a sodium, potassium or lithium derivative. Any alkyl groups in the amide advantageously have 1–6 carbon atoms and may, for example, be methyl, ethyl, propyl or hexyl groups. Branched alkyl groups such as isopropyl groups are preferred. Aralkyl groups are preferably monocyclic groups with 1–6 carbon atoms in the alkyl portion, for example benzyl or phenethyl groups. Aryl groups are preferably monocyclic, for example phenyl or tolyl groups. The branched alkylamides and the silylamides and particularly diisopropylamides and bis-trimethylsilylamides, give the most satisfactory results from the point of view of cleanness of reaction.

The formation of the 9,11-enolate from the 11-one is preferably effected in a polar, aprotic solvent, especially a solvent serving to solvate alkali metal cations. Suitable solvents include ethers and cyclic ethers such as tetrahydrofuran and dimethoxyethane, N,N-disubstituted amides such as tetramethylurea, dimethylformamide, dimethylacetamide, hexamethylphosphorus triamide and N-methyl pyrrollidone, and sulfoxides and sulfones such as dimethyl sulfoxide and sulfolane.

Steroids having a 5α- or particularly a 5β-hydrogen or bearing a dimethylhydrazone or methoxime group react sluggishly in tetrahydrofuran; in such cases it is advantageous to carry out the reaction in dimethylformamide, hexamethylphosphorus triamide, or a mixture of one of these with tetrahydrofuran. Usually, one to five molecular equivalents of an amide solvent is advantageous.

Formation of the 11-enolate may be monitored by removing an aliquot from the reaction mixture, treating it with benzoic anhydride and determining the product composition by N.M.R. or thin-layer chromatography.

When formation of the enolates has proceeded to completion the reaction mixture is treated with the perchloryl fluoride, care being taken to avoid the introduction of air or moisture. The fluorinating agent is preferably introduced as a slow stream of gas and appears to react almost instantly. This stage of the process is preferably carried out with cooling to prevent the generation of excessive heat. The reaction is preferably conducted at low temperatures which may be as low as the freezing point of the medium but when temperatures below —40° C. are used, care should be taken to avoid condensing unreacted perchloryl fluoride upon completion of the reaction.

In addition to the 11-oxo group and the stated configuration at the 5-position, the steroid substrate may carry advantageously a 3-substituent which is convertible into a 3-oxo group, for example a hydroxy, ether or ester group, an N,N-disubstituted hydrazone group, an alkoxime or acyloxime group, a dioxolane group or a dialkylketal or cyclic ketal group. Such groups can be converted into the 3-oxo group, where this is required, by conventional means, principally by hydrolysis; where a 3-hydroxy group is obtained or is present initially, oxidation using, for example, chromic acid or Oppenauer reagents will yield the desired oxo group.

Additional double bonds may be present, for example at the 1,2 or 16,17-positions and alkyl groups, for example methyl groups, may be present at the 6- and/or 16-position, in the α- or β-configuration, or in the 10- and/or 13-positions. Halogen atoms may be present at the 6- and/or 16-position. The 17-position may carry an oxo group or a hydrogen atom and a hydroxy, ether or acryloxy group or an aliphatic group which may, for example, carry one or more oxo and/or hydroxy substituents, provided that any oxo groups are protected, for example as ketals, N,N-disubstituted hydrazones or dioxolanes respectively. The corticoid side chain (17α-hydroxy-17β-hydroxyacetyl) is especially valuable and may advantageously be protected by a bis-methylene dioxide grouping. Where esters or ethers of hydroxyl compounds are used, these are preferably derived from aliphatic acids or alcohols having 1–6 carbon atoms, e.g. acetic or propionic acids or aromatic acids such as benzoic acid or corresponding alcohols. Hydrazone derivatives include, for example, dialkylhydrazones such as dimethylhydrazone, or N-alkylated semicarbazides. Alkoximes include, for example, methoximes.

Where free hydroxyl groups are present e.g. at the 3- or 17-position or in a 17-side chain it is necessary to add an additional equivalent of base to compensate for the removable hydrogen atom.

The following examples are given by way of illustration only:

EXAMPLE 1

Synthesis of 9α-fluorocortisone 17,20:20,21-bis-methylene dioxide 3-ethylene ketal A solution of sodium bis-trimethylsilylamide (700 mgs.) dissolved in tetrahydrofuran (15 ml.) was added to cortisone 3-ethylene ketal 17,20:20,21-bis-methylene dioxide (700 mgs.); the reaction mixture was allowed to stand for 5 minutes, then cooled to −20° C. Excess gaseous perchloryl fluoride was passed through the reaction mixture. Argon was then passed through to exhaust the excess perchoryl fluoride and the solution poured into an aqueous solution of potassium iodide and ice, stirred for 2 minutes and the iodine reduced with aqueous potassium thiosulphate. The product was isolated by extraction twice with methylene chloride. The combined organic extracts were washed with water, saturated aqueous sodium bicarbonate and aqueous sodium chloride, dried with sodium sulphate and concentrated to dryness. Crystallisation gave directly 9α-fluorocortisone 17,20:20,21-bis-methylene dioxide 3-ethylene ketal (650 mgs.) identical with an authentic specimen. Similar results were obtained with lithium bis-trimethylsilylamide although it was necessary to extend the time of enolisation to 25–30 minutes. Similar results were obtained with lithium diisopropyl amide.

Following the same procedure, 16α-methylcortisone 17,20:20,21 bis-methylene dioxide 3-ethylene ketal may be converted to 9α-fluoro-16α-methylcortisone 17,20:20,21-bis-methylene dioxide 3-ethylene ketal. 16β-Methylcortisone 17, 20:20,21-bis-methylene dioxide 3-ethylene ketal may be converted to 9α-fluoro-16β-methylcortisone 17,20:20,21-bis-methylene dioxide 3-ethylene ketal. Similarly, androst-4-ene-3,11,17-trione 3,17-bis-ethylene ketal may be converted to 9α-fluoroandrost-4-ene-3,11,17-trione 3,17-bis-ethylene ketal, and 17α-hydroxy-11-ketoprogesterone 3,20-bis-ethylene ketal may be converted to 9α-fluoro-17α-hydroxy-11-ketoprogesterone 3,20-bis-ethylene ketal. It is necessary in tis case, however, to use an additional equivalent of base to compensate for the removable hydrogen at the 17-position. Similarly, 11-ketoprogesterone 3,20-bis-ethylene ketal may be converted into 9α-fluoro-11-keto progesterone 3,20-bis-ethylene ketal.

EXAMPLE 2

Fluorination to give 17,21-dihydroxy-9α-fluoro-5β-pregnane-3,11,20-trione 17,20:20,21-bis-methylene dioxide 3-ethylene ketal A solution of sodium bis-trimethylsilylamide (1 gm.) dissolved in tetrahydrofuran (25 ml.) was added to 17,21-dihydroxy-5β-pregnane - 3,11,20 - trione 17,20:20,21-bis-methylene dioxide 3-ethylene ketal (1 gm.) The reaction mixture was allowed to stand for 5 minutes, then cooled to −20° C. and treated with perchloryl fluoride as in Example 1; further processing and working up as in Example 1 yielded the title compound (0.85 gm.) identical with material prepared by the action of $CF_3OF$ on the corresponding enol benzoate. Similar results weer obtained with the other bases referred to in Example 1, lithium amides again reacting more slowly than the corresponding sodium base.

I claim:
1. A process for preparing a 9α-fluoro-11-oxo-steroid which comprises:
   (a) enolizing an 11-oxo-steroid having a 4,5-double bond, a 5,6-double bond, or a 5-hydrogen atom by reaction with an alkali metal amide of the formula $MNR^1R^2$ wherein M is an alkali metal atom and $R^1$ and $R^2$ are each an alkyl, aryl, aralkyl, trialkylsilyl, triaralkylsilyl, or triarylsilyl group, provided that the 11-oxo-steroid contains no free 3-oxo group; and
   (b) subsequently reacting the resulting enolate produced in (a) with perchloryl fluoride to give the corresponding 9α-fluoro-11-oxo steroid.

2. A process as claimed in claim 1 wherein M in the formula is a sodium atom.

3. A process as claimed in claim 1 in which any alkyl groups in said amide are N-attached branched alkyl groups.

4. A process as claimed in claim 1 in which $R^1$ and/or $R^2$ in the formula are trimethylsilyl groups.

5. A process as claimed in claim 1 in which the enolisation is effected in a polar, aprotic solvent capable of solvating alkali metal cations.

6. A process as claimed in claim 1 wherein the fluorination reaction is effected by introducing the perchloryl fluoride as a slow stream of gas.

7. A process as claimed in claim 1 wherein the steroid starting material contains a hydroxy group, ether group, ester group, N,N-disubstituted hydrazone group, alkoxime group, acyloxime group, dioxolane group, dialkylketal group or cyclic ketal group at the 3-position.

8. A process as claimed in claim 1 wherein the steroid starting material is substituted by a halogen atom at at least one of the 6- and 16-positions.

9. A process as claimed in claim 1 wherein the steroid starting material carries at the 17-position a protected oxo group or a hydrogen atom and a member selected from the group consisting of hydroxy, ether, acyloxy, aliphatic and substituted aliphatic groups.

10. A process as claimed in claim 1 wherein the steroid starting material carries a 17α-hydroxy-17β-hydroxyacetyl or a bis-methylene dioxide protected 17α-hydroxyl-17β-hydroxyacetyl side chain.

11. A process as claimed in claim 1 in which the 11-oxo steroid starting material possesses a free hydroxyl group at the 3-position.

No references cited.

HENRY A. FRENCH, Primary Examiner

U.S. Cl. X.R.

260—239.55 C, 397.45